Patented Oct. 3, 1950

2,524,644

UNITED STATES PATENT OFFICE 2,524,644

METHOD OF PREPARING MOLDING BITUMINOUS MATERIAL AND PRODUCT THEREOF

Robert J. Wentland, Chicago, Ill., assignor to The Richardson Company, Lockland, Ohio, a corporation of Ohio No Drawing. Application August 3, 1945, Serial No. 608,848

7 Claims. (Cl. 106—282)

The present invention relates more particularly to the production of bituminous binders for use together with fillers including fibrous fillers, in the production of molding compounds. An example will be given of the practice of the invention with reference to production of a molding compound for hot molding of storage battery containers, but the utility of the compound is not confined to compositions for such containers alone, some of the improved qualities being highly advantageous in other products.

The object of the invention is to improve the blowing of asphaltic binders, to improve compounding of the same with fillers and more particularly fibrous fillers, with the result of improvement in the molding quality of the compound, and finally an improvement in the strength, resistance to shatter, and resistance to electric breakdown after prolonged exposure to acid of the final product.

In the production of asphaltic binders it is the practice to employ liquid asphaltic material known as residual oil or asphalt flux oil, which is the residue after removal of volatile constituents from crude petroleum having an asphaltic base. The operation of removal of the volatile constituents is known as "topping." This topped oil, which will be termed residual oil in the present application, is first raised to high temperature and blown with air for a number of hours thereby raising its melt point. As an example, in producing a molding asphalt, the residual oil in one commercial practice is raised to about 450° F., (although temperature may run from 350 to 500° F.) and blown with air in a still for 12 to 16 hours, which will raise its melt point by the standard ball and ring test to a value of between 240 and 250° F. This blowing time is an incident of the particular apparatus used and thus should not be taken as a requirement. Thus with apparatus of different capacities and efficiencies, longer or shorter time periods would be required. The ultimate melt point will depend on the amount of Gilsonite or harder asphalts later blended with the blown oil. In ordinary practice there is added to the blown oil when it has reached the desired melt point other asphaltic substances, such as Gilsonite, (a mineral asphalt), which imparts certain characteristics to the blend, and blowing may be continued further. For example, in making a Gilsonite blown oil blend, it is a practice to add the Gilsonite and blow for several hours with a finishing melt point of around 290° F. The skilled technician knows from experience or experiment what blend he requires to obtain certain characteristics of melt point and penetration at various temperatures suitable for a given molded product. This blending so far as the present invention is concerned, can be at the will of the operator. In most cases the blown oil will be brought to a melt point above about 200° F. before blending, but it will be understood that acceptable blends may be made with 60% or even as high as 80% Gilsonite (or other hard natural bitumen) with blown oils, in which case the initial melt point of the blown oil before blending need not be as high as 200° F.

The practice, according to the present invention, relates to forming binders for molding compositions and hence fairly high melt points will be required so that the molded product will not tend to become tacky when exposed to heat, or actually become somewhat soft. To the end of distinguishing the field of the present invention it is stated as being applied to "molding bitumens," which will, to those skilled in the art, distinctly limit the field of application of the invention.

What is done according to my invention is to add lime to the residual oil when blowing the same without otherwise changing the procedure. I am aware that lime has been used in blowing asphaltic oils which are later to be employed with solvents in paints and the like to prevent a jelling effect from the acid content of the asphaltic substances. The nature of the finished product and my objective of my invention are very different.

I find that by adding a small amount of lime (say 1%) to the residual oil before or during blowing, I saponify any organic acids present or produced during blowing, or asphaltous or other acids in the oil to begin with. Either the lime or the reaction products with the lime seem to have a catalytic effect to assist in the polymerization activity of the oils during blowing, as evidenced by the fact that I shorten the number of hours required for blowing. Furthermore, there is apparent no deleterious tendency for the material to settle in the stills used in blowing. Thus in producing a blown oil of 250° F. ball and ring melt point, it has been possible with the use of one per cent of lime by weight to the weight of the starting oil, to cut down the blowing time from 16 hours to 13 hours.

The stability toward heat of the asphalts used in forming molding compounds is an important factor. Thus if during the hot mixing of the molten binder with fibers and mineral matter, some volatile constituent should separate out, it will be likely to produce a bubble during molding, and produce a defaced molded product. It has been found that by the use of lime during the blowing of the residual oil, the stability of the resulting binder is enhanced. Thus it has been the practice, avoided at least in part by my present invention, to blow steam through the completed blend of asphaltic binder produced as above noted, for a number of hours in order to prevent cracking and remove light petroleum fractions that otherwise cause sticking of the binder during mixing and molding, and blisters during molding. Without the use of lime and with the best selection of grades of residual oil with minimum lighter fractions, plus the steam treatment, the stability test which is given, of heating above 500° F. in a reflux condenser, for several hours with agitation, has generally shown a drop of melt point of from five to ten degrees in our asphaltic binders. Yet with the addition of lime and in the complete absence of a steam blowing treatment, this stability test has shown no drop whatever in melt point, which means that the asphalt is stable to heat and does not crack. Indeed in some tests for stability, the binder produced with the use of lime during blowing actually hardened rather than softened.

Thus the blowing with steam of finished stills of asphaltic binder of the type noted may be saved in large part if not entirely, which is a large economy.

After the asphaltic binder is formed, it is mixed in the presence of heat and usually moisture with a filler. This filler will normally include organic or other fiber to give strength and mineral matter to impart hardness. Merely as an example, the binder will be mixed in an open jacketed Baker and Perkins or Day dough type mixer with 15% by weight of organic fiber, such as cotton linters, and 36% of acid resistant mineral matter such as infusorial earth, to 49% of the binder, percentages being by weight in the finished batch. Water or water vapor may be present and preferably will be present during the mixing.

When using the binder otherwise produced by blowing and blending in a normal manner, plus the addition of lime during blowing, and then incorporating organic fiber and mineral matter, we have been accustomed at our plants to produce molding compounds which when hot molded after complete mixing gave a tensile strength test of 1250 pounds per square inch, whereas with conditions otherwise as near the same as possible but without the use of lime, the best we could produce was 1100 pounds per square inch tensile strength. The impact value with the product produced with the use of lime was increased by 20%. The pendulum crack test as applied to the Ford type storage battery container on the regular material averages, sides 36, and ends 41, whereas, by the use of the lime during blowing, these figures were built up to sides 40, and ends 44.

The most outstanding improvement of the lime blown product was in shatter test. This test is carried out by dropping a one-pound steel bar from height of 2 feet on a ½" x ½" x 2½" sample and determining the number of blows required to shatter the sample. A molded sample of the regular binder gives a reading by this test of an average of 6, whereas the lime blown binder, otherwise treated alike and in a like molding composition, gives a test of 35. Bars of the lime blown binder, as compared to like bars but without the lime blowing gave 20% less absorption of acid. Also the conductivity of the regular product as compared to the lime blown product tested after exposure of both samples to battery acid for 30 days, showed, for the regular material, a resistance of 3 to 5 thousand ohms whereas the product formed from the lime blown residual oil showed 10 to 15 thousand ohms.

The theory as to why the molding composition product has so many advantages and behaves in processing as it does, is as indicated above, that by the use of the lime blowing, organic acids are neutralized, reducing sticking, and a neutral asphalt is produced which has less destructive effect on the organic fiber (cotton linters) during the mixing operation. It is also the theory that the presence of whatever metallic soaps there are in the binder improves its physical properties.

In order to illustrate the practice according to my invention, I give the following factory scale operation employed in the making of hot molded storage battery containers. Into a jacketed still equipped for blowing hot air through its contents was placed 42,500 pounds of residual oil of asphalt base petroleum, and 720 pounds of hydrated lime, 1% of the total, was added. The temperature was then raised to bring the asphalt to 450° F., and blowing in a standard manner was then begun. In 12 hours the residual oil had reached a ball and ring melt point of between 240 and 250° F. At that point 29,500 pounds of Gilsonite was added and fluxed or blended into the asphalt in the still. Blowing was continued for three hours until upon test the melt point of the mass by ball and ring was 290° F. The product then had a penetration of 16 (150° F., 5 second, 100 grams), and a susceptibility or rate of change in consistency when subjected to rising or falling temperatures accepted as standard for storage battery molding asphalt.

The binder in this instance, for example, had penetrations of:

11 (115° F.—5 sec. 50 gr.)
16 (150° F.—5 sec. 100 gr.)
25 (185° F.—5 sec. 200 gr.)

which is taken as standard for storage battery molding asphalt commonly used.

The asphaltic mass was then pumped into mixers from storage, held at melting heat and there combined with infusorial earth and cotton linters to a formula of 49% binder, 36% mineral matter, 15% cotton linters. Water was used in the mixers. The product of the mixers heated somewhat above the temperature of mixing, which was kept down by the water present, was then placed in extrusion mixers and extruded as a final working; and the material in weighed masses was then placed in the cavities of storage battery container molds, and a standard molding operation carried out.

In cases where acid resistance is not important, the amount of organic fiber or other fiber (glass, asbestos, etc.) need not be limited and the mineral matter may be cut down considerably or eliminated entirely subject to requirements of hardness of the molded product.

The data as to improvement over standard practice given above were shown in a practice of which the above is an outline.

By the present improvement in molding asphalts there have been attained decided improvements both in processing and product which may be listed as follows: stability of the lime treated asphalt to heat; improved molding qualities due to reduction in the tendency of the compound to stick to the molds; less tendency for the compound to form blisters during the molding operation or after the molded articles are in service; better color and appearance of the finished box; much better resistance to shatter; somewhat improved impact resistance; a better resistance to the passage of electric current over the surface after long exposure to battery acid. By blending agent in the claims that follow I refer to bituminous material selected to impart characteristics to the blown asphalt, such as, Gilsonite to impart hardness, it being normal practice to make such blends, as hereinabove noted.

Having thus described my invention, what I claim as new and desire to secure by Letters Patent is:

1. In the process of preparing a molding composition of bitumen and filler, the steps of mixing lime with residual asphaltic base petroleum oils, and blowing the mixture while in molten condition for a number of hours until the ball and ring melt point has been raised to a degree which after blending will produce a binder of the penetration, melt point and susceptibility required for said molding composition.

2. The process set forth in claim 1, in which the lime added is an amount of hydrated lime which is substantially one percent by weight of the mixture.

3. The process of claim 1 in which the filler in the composition comprises organic fiber.

4. In the process of preparing a molding composition of bitumen and filler including fibrous material the steps which consist in mixing lime with residual asphaltic base petroleum oils, blowing the mixture in molten condition for a number of hours until the ball and ring melt point has been raised to 200° F. or above, blending into the blown material natural bituminous material to make the desired blend, and blowing the mixture for a relatively shorter period with air until a higher melting point for the mixture has been obtained than the first temperature noted.

5. A molding composition comprising a bituminous binder at least 20% of which is blown residual asphaltic base petroleum oil, in which acid substances have been saponified with lime during blowing, and the remainder of the bituminous binder is a hard natural bitumen, together with intimately intermixed filler which in part at least consists of fibrous material.

6. The molding composition claimed in claim 5 in which the said fibrous material is organic fiber.

7. The molding composition clamed in claim 5 in which the said fibrous material is cotton linters.

ROBERT J. WENTLAND.

REFERENCES CITED

The following references are of record in the file of this patent:

UNITED STATES PATENTS

| Number | Name | Date |
| --- | --- | --- |
| 1,711,544 | Sato et al. | May 7, 1929 |
| 1,755,500 | Chamberlain | Apr. 22, 1930 |
| 2,179,208 | Burk | Nov. 7, 1939 |
| 2,342,861 | Hemmer | Feb. 29, 1944 |
| 2,383,701 | Becker et al. | Aug. 28, 1945 |

OTHER REFERENCES

Asphalts and Allied Substances, page 480. 5th edition. Van Nostrand Company.